United States Patent [19]
Michaelis et al.

[11] Patent Number: 6,106,317
[45] Date of Patent: Aug. 22, 2000

[54] IC CHIP CARD CONNECTOR WITH PIVOTALLY AND LINEARLY MOVABLE COVER

[75] Inventors: Daniel K. Michaelis, Cordova; Mark A. Page, Collierville, both of Tenn.

[73] Assignee: Thomas & Betts International, Inc., Sparks, Nev.

[21] Appl. No.: 08/938,305

[22] Filed: Sep. 26, 1997

[51] Int. Cl.⁷ .................................................. H01R 13/62
[52] U.S. Cl. ........................ 439/326; 439/331; 235/486
[58] Field of Search .................................... 439/326, 325, 439/296, 331, 52

[56] References Cited

U.S. PATENT DOCUMENTS

| | | | |
|---|---|---|---|
| 3,883,856 | 5/1975 | Saito et al. | 365/52 |
| 4,216,522 | 8/1980 | Slagel et al. | 361/728 |
| 4,378,139 | 3/1983 | Griffin et al. | 439/331 |
| 4,449,775 | 5/1984 | dePommery et al. | 439/373 |
| 4,602,351 | 7/1986 | Simamura et al. | 365/52 |
| 4,743,746 | 5/1988 | Murschall et al. | 235/486 |
| 4,758,176 | 7/1988 | Abe et al. | 439/331 |
| 4,820,186 | 4/1989 | Fujii | 439/326 |
| 4,843,223 | 6/1989 | Shino | 235/487 |
| 5,224,873 | 7/1993 | Duffet et al. | 439/326 |
| 5,320,552 | 6/1994 | Reichardt et al. | 439/331 |
| 5,603,629 | 2/1997 | DeFrasne et al. | 439/331 |
| 5,791,915 | 8/1998 | Kubo | 439/73 |
| 5,807,118 | 9/1998 | Tsubota | 439/73 |
| 5,813,878 | 9/1998 | Kuwata et al. | 439/326 |

FOREIGN PATENT DOCUMENTS

| | | |
|---|---|---|
| 0131410 | 1/1985 | European Pat. Off. . |
| 0633633B1 | 1/1995 | European Pat. Off. . |
| 2021334 | 11/1979 | United Kingdom . |
| 2251505 | 7/1992 | United Kingdom . |

*Primary Examiner*—Khiem Nguyen
*Assistant Examiner*—Michael C. Zarroli
*Attorney, Agent, or Firm*—Hoffmann & Baron, LLP

[57] ABSTRACT

An electrical connector provides for the connection of the contact pads of an IC card to a printed circuit board. The connector includes a base supportable on the printed circuit board and a cover pivotally removable with respect to the base. The base supports a plurality of electrical contacts. Each contact has a spring element and a contact tail extending from the base for termination to the printed circuit board. The cover is pivotally movable from an open position permitting insertion and removal of the card from the cover to a closed position with the contact pads of the IC card being positioned adjacent the spring elements. The cover is further movable linearly from the closed position to a locked position locking the cover to the base and moving the contact pads over the spring elements and into electrical engagement therewith.

10 Claims, 7 Drawing Sheets

IC CHIP CARD CONNECTOR WITH PIVOTALLY AND LINEARLY MOVABLE COVER

FIELD OF THE INVENTION

The present invention relates generally to an electrical connector which supports an integrated circuit (IC) card to a printed circuit board. More particularly, the present invention is directed to a chip card connector which provides for the easy insertion and removal of the chip card from the connector.

BACKGROUND OF THE INVENTION

The electronic industry has seen growth in the use of flat plastic cards incorporating computer chips therein. These chip or IC cards are also commonly referred as to as "smart cards". A smart card is a card incorporating at least one electronic component to which electrical connection must be made. These cards include contact pads so as to allow electrical connection to the electronic component on the card. Smart cards are commonly used in various consumer oriented apparatus and machines such as telephones, bank machines and the like.

One particular type of smart card commonly used in telephones, especially cellular telephones, is a mini-card or a mini-SIM (subscriber identity module) card. These cards have a particular industry-accepted standard for size, shape and location of the electronic components and contact pads. These mini-SIM cards are typically installed in the apparatus, such as the cellular phone, by a trained installer.

In order to effect electrical connection between the mini-SIM card and a printed circuit board within the cellular phone, an electrical connector is employed. These connectors also are manufactured in an industry-accepted configuration so that the mini-SIM card may be accommodated by the connector. However, for various purposes, such as for example, to change the subscriber identity, it may be necessary to replace the mini-SIM card within the phone. Thus, the electrical connector used to support the mini-SIM card in the phone must permit the easy replacement of cards therein. The art has seen numerous electrical connectors specifically designed for use in removably connecting various types of smart cards.

U.S. Pat. No. 5,603,629 discloses a connector for a mini-SIM type smart card having a base supporting a plurality of electrical contacts. The base is mounted to a printed circuit board in the phone. A cover is pivotally attached to the base and includes a slot for retention of the card therein. The cover may be pivotally closed onto the base to place the pads on the card in electrical connection with the contacts held in the base. The cover is movable from an open position permitting insertion and removal of the card to a closed position establishing such electrical connection.

U.S. Pat. No. 4,820,186 provides another example of a smart card connector having a cover which pivotally mounts to the base. The card may be inserted and removed from the cover from an open position. The cover is pivotally rotated to a closed position establishing electrical connection with the contacts in the base. The cover is spring loaded with respect to the base so as to mechanically lock the cover to the base in the closed position.

U.S. Pat. No. 5,320,552 also describes a smart card connector having a cover for accommodating the smart card and which is pivotally mounted to a base. In addition to the cover being pivotally movable with respect to the base so as to move the smart card into connection with the contacts in the base, the cover is also movable linearly movable over the smart card to lock the cover to the base.

In each of the above-referenced patents, electrical connection is established between the contact pads of the card held in the cover and the electrical contacts supported in the base, by simple pivotal movement of the cover with respect to the base. Once the cover is pivoted down onto the base, electrical connection is established. Locking of the cover to the base is done in a separate sequential operation.

During installation it is quite common for the installer to select a particular IC card from a plurality of cards which is being carried by the installer for installation into a particular connector. As a result of transporting, handling and installing such a card, there is a tendency for the contact pads on these cards to accumulate dust and debris. Such accumulation may adversely effect the interconnection between the contact pads on the card and the contacts in the connector. Simple rotational movement of the card into engagement with contacts of the base does little to assure clean connection therebetween. Furthermore, as the cover is locked to the base in a separate operation, mechanical connection of the card to the connector is not always assured even where electrical connection is established. Over time the chip card could dislodge from the connector without prior warning.

It is therefore desirable to provide an electrical connector for accommodating a smart card which establishes electrical connection by wiping the contact locations of the card upon connection of the card with the contacts in the base.

SUMMARY OF THE INVENTION

It is an object of the present invention to provide an electrical connector for insertably connecting a chip card.

It a further object of the present invention to provide an electrical connector which supports an IC card for movement into connection with contacts supported by the connector.

It is still a further object of the present invention to provide an electrical connection for a chip card which provides for wiping engagement between the contact locations on the chip card and the contacts of the connector to assure proper electrical connection therebetween.

In the efficient attainment of these and other objects, the present invention provides an electrical connector for connecting contact pads of a IC card to a printed circuit board. The connector includes a connector housing having a base supportable on a printed circuit board and a cover movably supported to the base. A plurality of elongate electrical contacts are supported by the base. Each contact includes a spring element for deflectable electrical engagement with the contact pads of the IC card and contact tails extending from the base for termination to the printed circuit board. The IC card is insertably supported by the cover for movement therewith. The cover is pivotally movable from an open position permitting insertion and removal of the card from the cover to a closed position. In such closed position the contact pads of the IC card are positioned adjacent but not in full electrical engagement with the spring elements. The cover is then linearly movable from the closed position to a locked position, for locking of the cover to the base and for moving the contact pads of the IC card over the spring elements and into wiping electrical engagement therewith.

As more particularly described by way of a preferred embodiment herein, the connector includes a card support means on the cover for supporting IC card therein. The card support means includes a plurality of retaining members formed integrally with the cover. The card support means and the cover define a slot for the insertion and the removal of the card therein.

DETAILED DESCRIPTION OF THE PREFERRED EMBODIMENT

Figure 1:
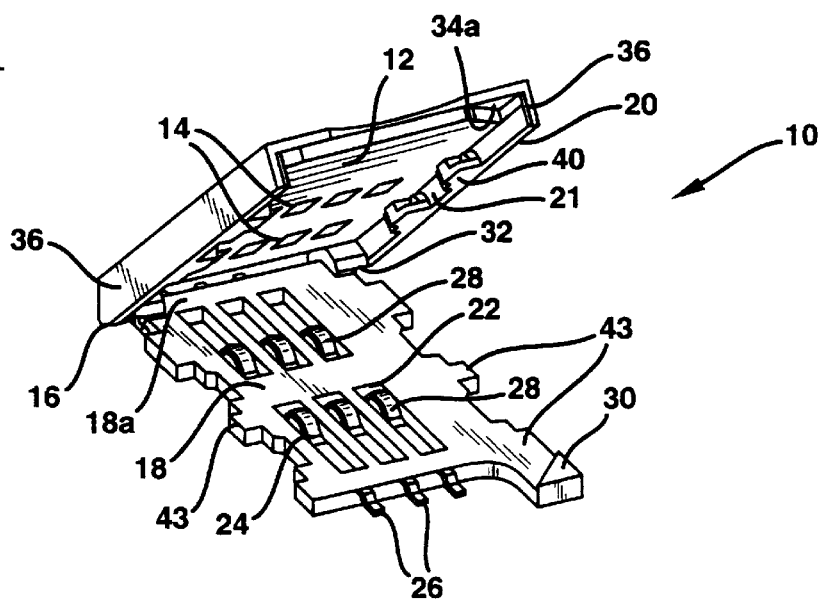
FIG. 1 is a front perspective showing of the connector of the present invention including a cover and a base with the cover shown in the open condition for insertion and removal of a chip card.
Figure 2:
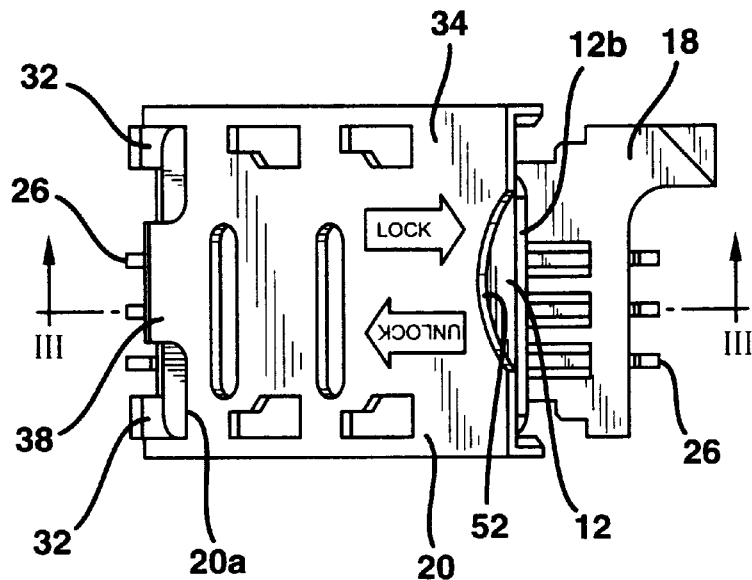
FIG. 2 is a top plan view of the connector of FIG. 1.
Figure 3:
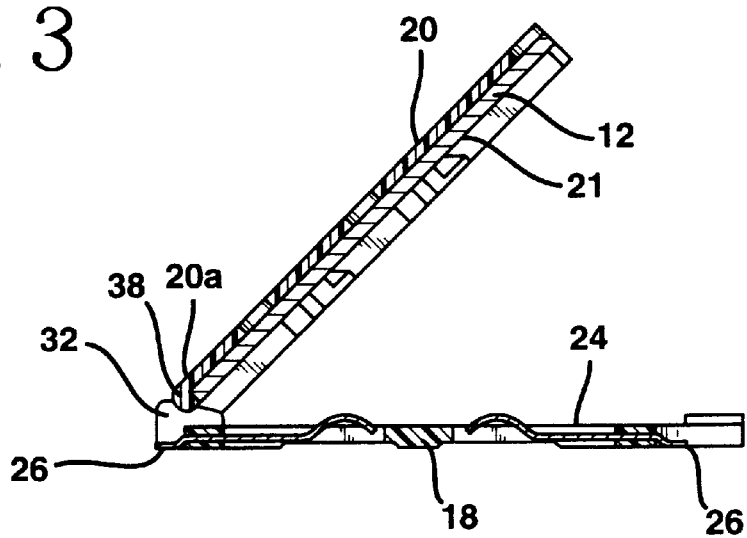
FIG. 3 is a sectional showing of the connector of FIG. 2 taken through the lines III—III thereof.

As shown in FIGS. 1–3 the present invention provides an electrical connector 10 which may be used to mechanically and electrically connect a chip card 12 to a printed circuit board to (not shown). The present invention has particular utility in mechanically and electrically connecting chip cards of the type known as smart cards which provide an electronic component on the card which is electrically accessible by electrically conductive contact pads 14 on one surface of the chip card 12. The particular embodiment of the chip card shown herein is a mini-SIM card and connector 10 may be particularly used in consumer accessible electronics, more particularly cellular phones. It is desirable to insert and remove chip cards 12 from connector 10 for various purposes such as to change the subscriber's identity with regard to a particular cellular phone. Accordingly, the connector of the present invention is designed to provide ease of insertion and removal of the chip card 12 with respect to connector 10 and also to provide reliable mechanical and electrical interconnection therewith.

Connector 10 of the present invention includes a two-part connector housing 16 including a base 18 and a cover 20 mounted to base 18. Housing 16 may be formed of suitable insulative plastic. Base 18 is generally an elongate flat planar member having a plurality of apertures 22 therethrough.

Base 18 supports a plurality of electrical contacts 24 within apertures 22. Contacts 24 are formed of an electrically conductive material and are elongate members having oppositely directed contact tails 26 extending from base 18 for solder connection to the printed circuit board. Contacts 24 further include at the end opposite tails 26 spring contact elements 28 extending above the plane of base 18. Spring contact elements 28 are designed for resilient electrical engagement with the contact pads 14 of chip card 12 as will be described in further detail hereinbelow.

Base 18 includes a polarization tab 30 at one corner thereof for polarized accommodation of chip card 12 preventing chip cards from being positioned in connector 10 in an incorrect orientation. Base 18 further includes at one end 18a thereof a pair of transversely spaced shoulders 32 which extend upwardly from base 18. Shoulders 32 provide for movable accommodation of cover 20 on base 18 in a manner which will be described in further detail hereinbelow. Base 18 also includes a pair of spaced apart laterally projecting ears 43 along each longitudinal side thereof. Ears 43 define spaces 50 therebetween.

Cover 20 is generally an elongate member having a planar cover wall 34 and a pair of parallel side walls 36 depending from cover wall 34. Cover 20 is of size and shape so as to accommodate chip card 12 along an undersurface 34a of cover wall 34. Cover 20 further includes a downwardly directed central foot portion 38 at one end 20a which provides a mechanical stop and a seat for an end 12a of chip card 12 as it is inserted into cover 20. The side walls 36 of cover 20 each include a pair of longitudinally spaced inwardly directed ledges 40 which are spaced a distance from the undersurface 34a of cover wall 34. The spacing between ledges 40 and undersurface 34a is slightly larger than the thickness of chip card 12 so as to form slot 21 for accommodating chip card 12 therein.

Figure 10:
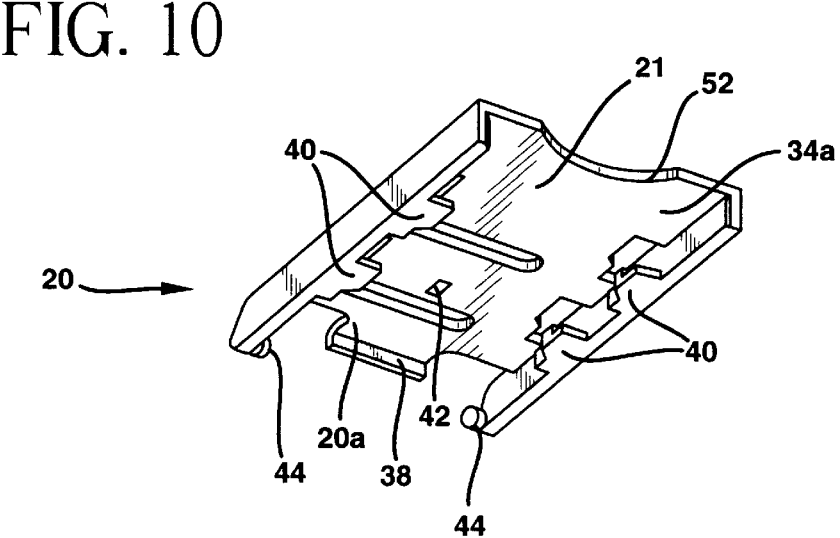
FIG. 10 is a bottom perspective view of the cover of the connector of FIG. 1.
Figure 11:
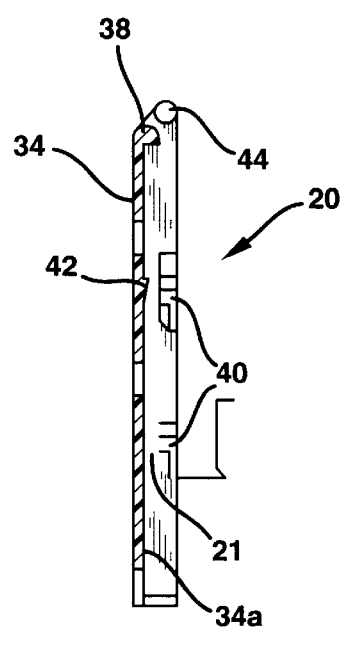
FIG. 11 is a vertical sectional showing of the cover of FIG. 10.
Figure 12:
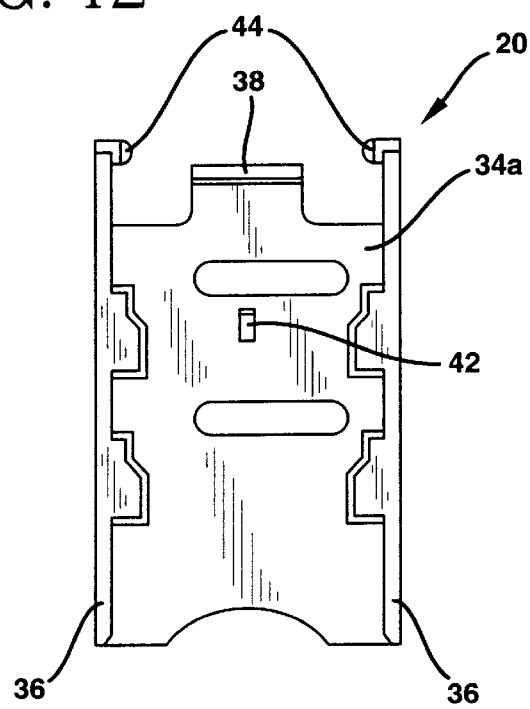
FIG. 12 is a bottom plan view of the cover of FIG. 10.

With additional reference to FIGS. 10, 11 and 12, undersurface 34a of cover 20 also includes a downwardly directed central protrusion 42. Protrusion 42 extends in a direction towards ledges 40 so as to decrease the effective width of slot 21 defined therebetween, so as to provide frictional retainment of the chip card 12 when it is inserted therein. Such frictional retaining of the chip card 12 helps positionally stabilize the chip card as the cover 20 is closed onto base 18 as will be described in further detail hereinbelow.

Figure 1A:
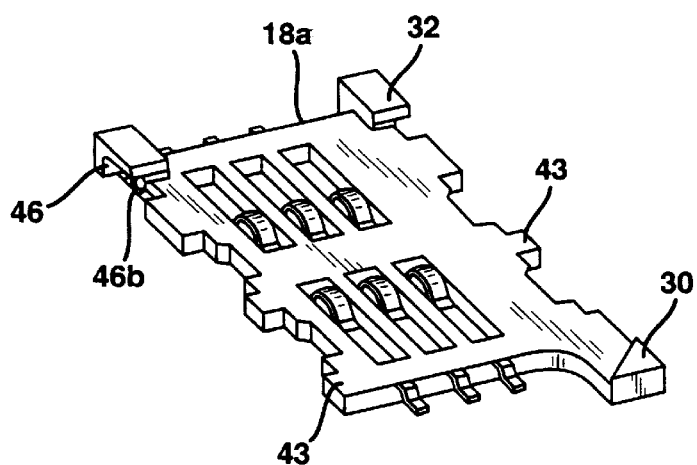
FIGS. 1a and 1b are top perspective and side elevational showings respectively of the connector base of FIG. 1.

Cover 20 further includes adjacent end 20a a pair of inwardly directed pivot pins 44 which are designed for accommodation within channels 46 of shoulders 32 of base 18. As more particularly show in FIGS. 1a and 1b, the channels 46 include a pair of spaced-apart pin receiving recesses 46a and 46b. These recesses permit the accommodation of cover 20 on base 18 at two longitudinally spaced locations.

Figure 1B:
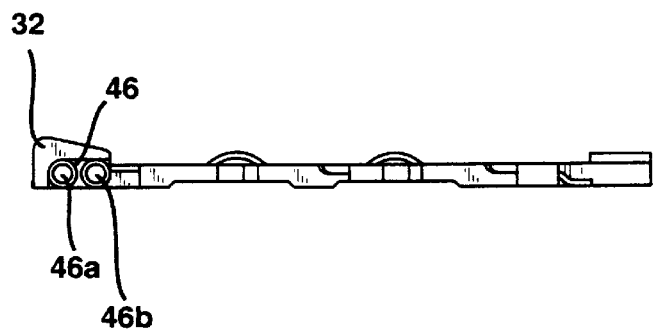

Having generally described the connector 10 of the present invention, its operation may now be described with respect to the figures. As shown particularly in FIGS. 1 and 2, cover 20 is shown in the open position with respect to base 18. In this position, the pivot pins 44 of cover 20 (FIGS. 10 and 12) are positioned within rear recess 46a of channels 46 (FIG. 1b). The cover 20 is pivoted to a position with respect to base 18 approximately shown in FIGS. 1 and 3. In this position, the chip card may be inserted into the slot 21 defined between the undersurface 34a of cover wall 34 and the protruding ledges 40 from sidewalls 36. The chip card 12 is inserted until the end 12a of the chip card abuts against depending foot portion 38 as shown in FIGS. 2 and 3. The cover 20 is then pivoted down towards base 18 about pivot pins 44 so that the ledges 40 reside in respective spaces 50 between ears 43 of base 18.

Figure 4:
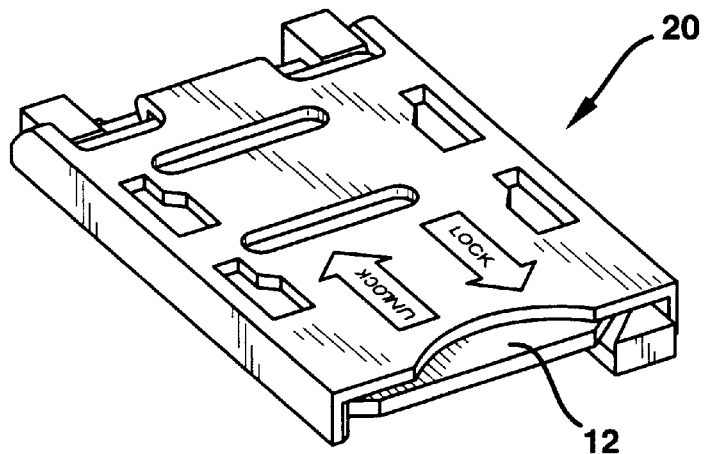
FIG. 4 is a front perspective view of the connector of FIG. 1 shown with the cover in the closed position with respect to the base.
Figure 5:
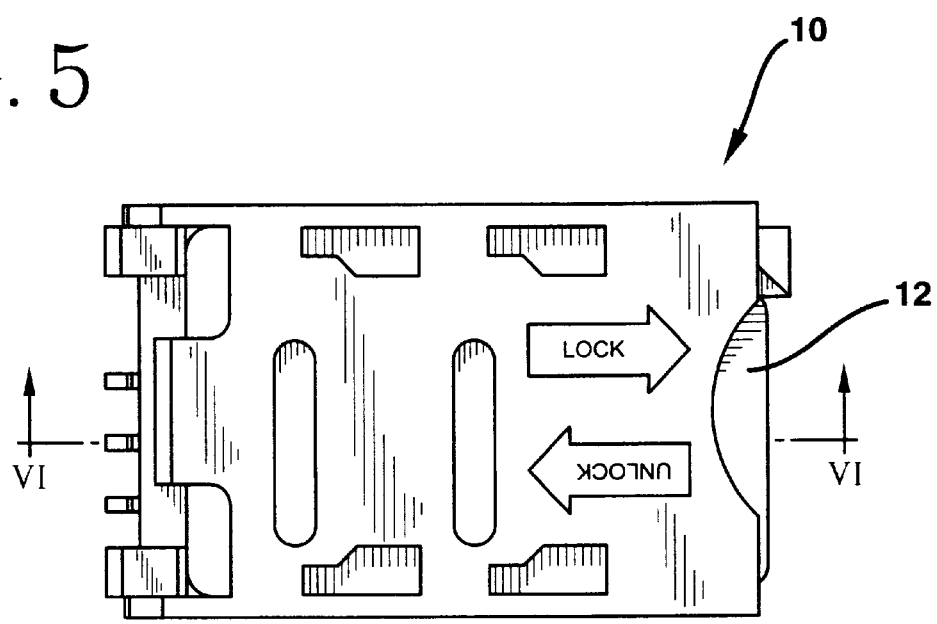
FIG. 5 is a top plan view of the connector of FIG. 4.
Figure 6:
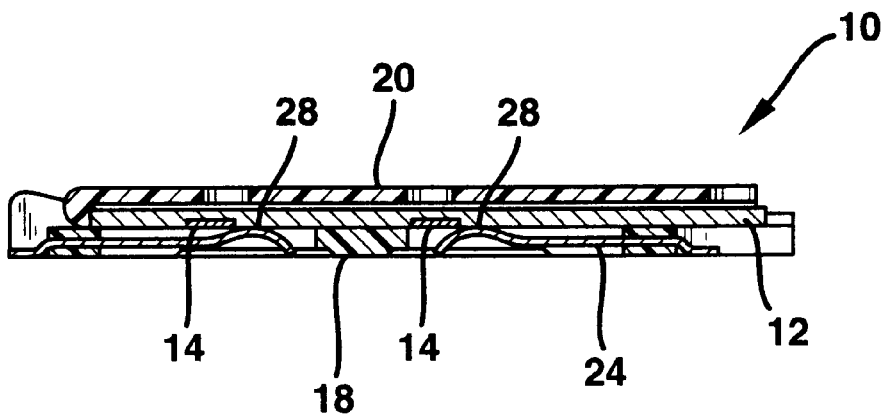
FIG. 6 is a cross-sectional showing of the connector of FIG. 5 taken through the lines VI—VI thereof.
Figure 6A:
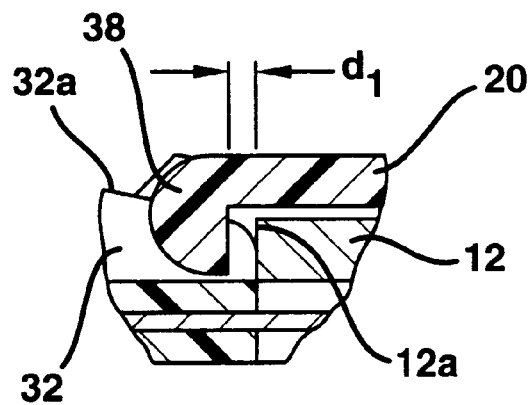
FIG. 6a is an enlarged partial sectional view of the connector of FIG. 6.
Figure 7:
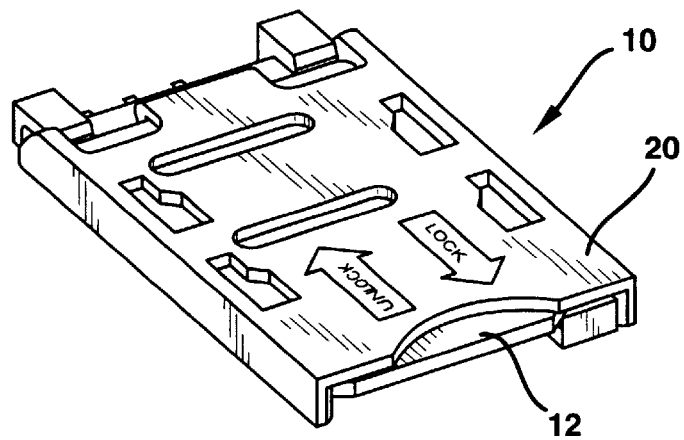
FIG. 7 is a front perspective view of the connector of FIG. 1 with the cover shown in the locked position with respect to the base.
Figure 8:
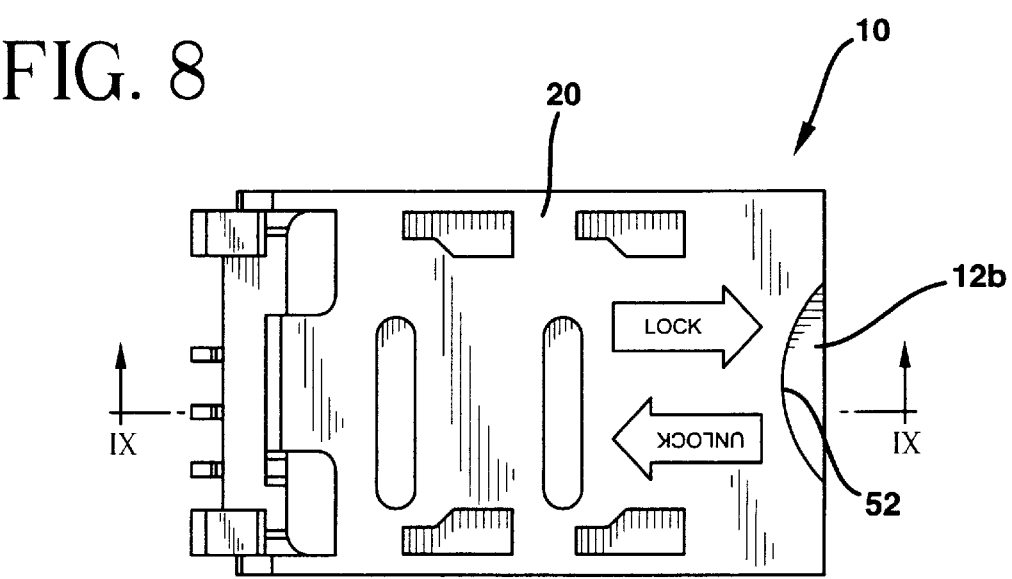
FIG. 8 is a top plan view of the connector of FIG. 7.

The cover is now in closed position as shown in FIGS. 4–6a. Upon the pivotal closure of cover 20 with respect to base 18, the end 12a of chip card 12 may ride along the inwardly tapered upper surface 32a of shoulder 32 in a ramplike fashion. This will cause some slight forward movement of chip card 12 within the slot 21 of cover 20 until it is located at a position shown in FIGS. 6 and 6a with the end 12a of chip card 12 spaced a distance $d_1$ from the depending foot portion 38. As shown in FIG. 6, in the closed position, the contact pads 14 are positioned adjacent to but not in full electrical engagement with the spring contact elements 28 of contacts 24.

The chip card 12 is held in frictional engagement within cover 20 moving only under the ramped urging of tapered upper surface 32a of shoulder 32 by the frictional engagement of the chip card 12 with protrusion 40 extending from the undersurface 34a of top wall 34. Such frictional engagement is sufficient to prevent unwanted movement of the chip card 12 within the slot 21 of cover 20 yet permit the chip card to be ramped forward upon pivotally closing cover 20.

After the cover 20 achieves the closed position shown in FIGS. 4–6, the cover may be locked to the base to mechanically secure the cover to the base and further to move the contact pads 28 in a wiping action over the spring contact elements 14 and into electrical engagement therewith.

Referring now to FIGS. 7–9a, the locked position of cover 20 with respect to base 18 is shown. In this position, the cover 20 is moved linearly with respect to base 18 in the direction of arrow A so that the pivot pins 44 move out of rear recess 46a and into front recess 46b (FIG. 1b). A light snap engagement is maintained between pivot pins 44 and recesses 46a and 46b. This snap engagement may be overcome by manual force. Such longitudinal movement causes re-engagement of depending foot portion 38 with the end 12a of card 12 so as to urge or carry the card forward a distance $d_2$ in the direction of arrow A and to place the contact pads 14 into wiping electrical engagement with the spring contact elements 28 of contacts 24. Such wiping movement provides sufficient frictional engagement, due to the spring bias of the spring contact elements 28, to remove any dust or debris which may exist at the interface of spring contact elements 28 and contact pads 14. In addition to placing contact pads 14 into electrical engagement with spring contact elements 20, such forward movement in a direction of arrow A serves to mechanically lock the cover to base 18. Downwardly directed ledges 40 are configured to frictionally accommodate ears 43 of base 18 upon such linear movement of cover 20 so as to latch with the ears 43 to thereby mechanically secure the cover 20 to the base 18 preventing the cover from being pivotally opened in the locked position. Such locking of cover 20 to base 18 assures the maintenance of electrical engagement between contact pads 14 and spring contact elements 28 as well as positionally retains chip card 12 within connector 10.

As mentioned above and as shown in FIGS. 6 and 9, full electrical engagement between pad 14 of chip card 12 and spring contact elements 28 of contacts 24 is not established until cover 20 is locked to base 18. However, owing to tolerances in the manufacture of chip cards 12 and connectors 10, slight intermittent non-electrical engagement of pads 14 to spring contact elements 28 may be achieved in the closed but unlocked position (FIG. 6). It is, however, only upon locking of cover 20 to base 18 (FIG. 9) that positive electrical engagement is achieved.

Figure 9:
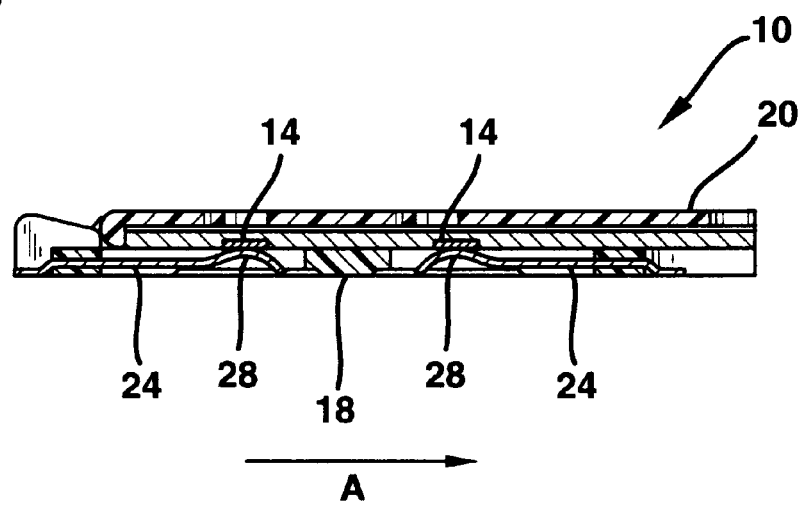
FIG. 9 is a cross-sectional view of the connector of FIG. 8 taken through the lines IX—IX thereof.
Figure 9A:
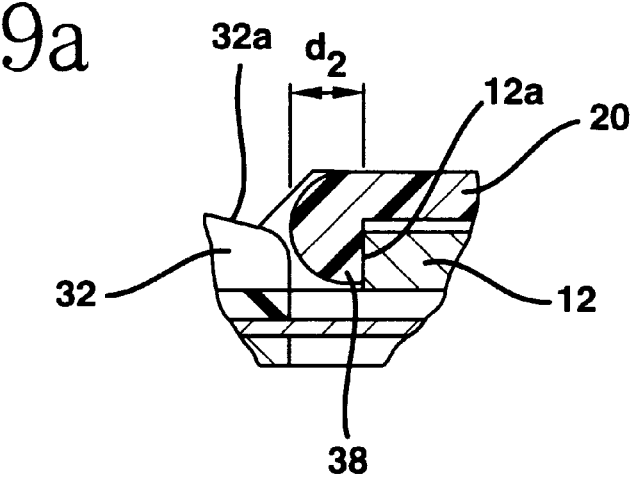
FIG. 9a is an enlarged partial sectional view of the connector of FIG. 9.

In order to remove chip card 12 from connector 10 for repair or replacement, the cover 20 is moved linearly rearward in a direction opposite arrow A (FIG. 9). The pivot pins 44 move out of forward recess 46b and into rear recess 46a. Once cover 20 is moved to this position, the ledges 40 of cover 20 clear the ears 43 of base 18. This allows the cover to be pivoted upwards to a position shown in FIGS. 1, 2 and 3. In this position, the installer may manually grasp the opposite edge 12b of card 12, access being provided by an undercut 52 in the leading edge of cover 20. The installer may then repair or replace chip card 12 and reconnect the chip card in connector 10.

The present invention provides superior electrical connection between the contact pads 14 of chip card 12 and the spring contact elements 28 of contacts 24 in base 18 by providing for wiping engagement therebetween. Such wiping engagement is provided by moving the chip card with the cover 20 in a linear direction from a closed but unlocked position to a locked position. Furthermore, assurance is provided that the chip card is properly secured within the connector as unless locking engagement is provided between the cover and the base, the contact pads of the chip card will not be in full operating electrical engagement with the contacts 24 of the base. Such positioning may not provide proper electrical functioning of the device. It is only upon locking of the cover to the base that the pads of chip card will be in full electrical engagement of the contacts of the connector.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical connector for connecting contact pads of an IC card to a printed circuit board comprising:
    a connector housing having a base supportable on said printed circuit board and a cover movably supported to said base;
    a plurality of elongate electrical contacts supported by said base, each said contact including a spring element for deflectable electrical engagement with said contact pads of said IC card and a contact tail extending from said base for termination to said printed circuit board; and
    card accomodating means included on said cover for insertably supporting said IC card on said cover for movement therewith;
    said cover being pivotally movable from an open position for permitting insertion and removal of said card from said cover to a closed position with said contact pads of said IC card being positioned adjacent said spring elements and said cover being linearly movable from said closed position to a locked position for locking said cover to said base and for moving said contact pads over said spring elements and into electrical engagement therewith.

2. An electrical connector of claim 1 wherein said card accomodating means includes a plurality of ledge members formed with said cover.

3. An electrical connector of claim 2 wherein said ledge members together with said cover form a slot for accommodating said IC card.

4. An electrical connector of claim 3 further including a central element for frictionally retaining said IC card within said slot.

5. An electrical connector of claim 3 wherein said base includes a plurality of protrusions, said protrusions being engagable with said retaining members of said cover upon movement from said closed position to said locked position to latch said cover to said base.

6. An electrical connector of claim 3 wherein said base includes a plurality of laterally extending ears and wherein said accomodating members includes latch portions engagable with said ears for releasably latching said cover to said base upon said linear movement of said cover.

7. An electrical connector of claim 1 wherein said base is generally a planar member having a plurality of apertures therein, said spring elements being retained in said apertures.

8. An electrical connector of claim 7 wherein said spring elements include portions thereof extending above the plane of said base.

9. An electrical connector of claim 1 wherein said base includes a polarization tab for polarized accommodation of said IC card.

10. An electrical connector of claim 9 wherein said polarization tab accommodates said card in said closed and said locked positions.

* * * * *